United States Patent [19]
Maki et al.

[11] Patent Number: 5,609,368
[45] Date of Patent: Mar. 11, 1997

[54] SEPARATION PREVENTIVE PIPE JOINT

[75] Inventors: Atsushi Maki; Toshio Toshima; Takahiro Ishihara, all of Amagasaki, Japan

[73] Assignee: Kubota Corporation, Osaka, Japan

[21] Appl. No.: 604,476

[22] Filed: Feb. 21, 1996

[30] Foreign Application Priority Data

Jul. 26, 1995 [JP] Japan .................................. 7-189642
Dec. 8, 1995 [JP] Japan .................................. 7-319860

[51] Int. Cl.$^6$ .................................................. F16L 25/00
[52] U.S. Cl. ........................... 285/12; 285/231; 285/321
[58] Field of Search .................................. 285/230, 231, 285/374, 321, 12

[56] References Cited

U.S. PATENT DOCUMENTS

| | | | |
|---|---|---|---|
| 2,245,153 | 6/1941 | McWane | 285/231 X |
| 3,345,085 | 10/1967 | Hones | 285/321 X |
| 4,116,478 | 9/1978 | Yamaji et al. | 285/321 X |
| 4,133,563 | 1/1979 | Yomazaki | 285/231 |

FOREIGN PATENT DOCUMENTS

4155516  1/1994  Japan .

Primary Examiner—Dave W. Arola
Attorney, Agent, or Firm—Barnes, Kisselle, Raisch, Choate, Whittemore & Hulbert, P.C.

[57] ABSTRACT

A separation preventive pipe joint is provided, in which a locking ring is held by an elastic ring with its axis centered in a locking ring receiving groove. An outer peripheral projection is formed on an end portion of the spigot, the outer peripheral projection being engageable with the locking ring from a location deeper than the locking ring. An inner peripheral projection is formed in an inner peripheral portion of the socket which is located deeper than the locking ring receiving groove for backing up the locking ring. A first inner peripheral surface having a larger diameter than the inner peripheral projection is formed in an inner peripheral portion of the socket which is located deeper than the inner peripheral projection. A second inner peripheral surface is formed between the first inner peripheral surface and the inner peripheral projection, the second inner peripheral surface being larger than the inner peripheral projection and smaller than the first inner peripheral surface in diameter.

7 Claims, 8 Drawing Sheets

SEPARATION PREVENTIVE PIPE JOINT

FIELD OF THE INVENTION

The present invention relates to a separation preventive pipe joint and, more particularly, to a separation preventive pipe joint of slip-on type wherein a socket is formed in an end portion of one of two pipes to be joined together and a spigot is formed in an end portion of the other pipe, the two pipes being joined by inserting the spigot into the socket.

BACKGROUND OF THE INVENTION

The slip-on type pipe joints are so constructed as to enable the socket and the spigot to be joined together by inserting the spigot into the socket provided with a seal packing fitted in a packing receiving groove formed in the inner periphery of the socket while compressing the seal packing. There has been known such a slip-on type joint having separation preventive capability.

In the known separation preventive pipe joint, a locking ring receiving groove is formed at a location in the inner periphery of the socket deeper than the packing receiving groove, and a locking ring having one split in the circumference thereof is fitted in the locking ring receiving groove. Between the outer periphery of the locking ring and the inner periphery of the locking ring receiving groove is disposed an elastic ring for holding the locking ring with its axis concentric. On the outer periphery of the end portion of the spigot is formed a projection which is engageable with the locking ring from the deeper side of the socket. A small-diameter portion which is smaller in diameter than the locking ring receiving groove is formed in an inner peripheral portion of the socket at a location deeper than the locking ring receiving groove. The small-diameter portion has a given length along the axial direction of the pipe such as to permit the end portion of the spigot formed with the projection to be freely moved in the axial direction of the pipe between the locking ring and the deeper end of the socket, thereby imparting expansibility and retractability to the pipe joint.

With the construction of such a known separation preventive pipe joint, however, since the small-diameter portion having a predetermined diameter is formed from a peripheral edge of the locking ring receiving groove to the deeper end of the socket, the projection is likely to abut against the inner periphery of the small-diameter portion when the socket and spigot are bent relative to each other, particularly where the spigot is inserted up to the deeper side of the socket and hence the projection of the spigot is positioned close to the deeper end of the socket. This makes it impossible to impart sufficient bendability to the pipe joint.

SUMMARY OF THE INVENTION

It is an object of the present invention to propose a pipe joint of this type with a sufficient bendability between the socket and the spigot even when the spigot is inserted up to the deeper side of the socket.

To attain this object, the present invention provides a separation preventive pipe joint wherein a spigot formed in an end portion of one of two pipes to be joined together is insertable into a socket formed in an end portion of the other pipe, the pipe joint comprising: a locking ring receiving groove formed in an inner periphery of the socket; a locking ring having one split in the circumference thereof and fitted in the locking ring receiving groove; an elastic ring interposed between an inner periphery of the locking ring receiving groove and an outer periphery of the locking ring and holding the locking ring while centering the same; an outer peripheral projection formed on an outer periphery of an end portion of the spigot, the outer peripheral projection being capable of passing through the locking ring toward a deeper side of the socket while resiliently enlarging the diameter of the locking ring when the spigot is inserted into the socket and being engageable with the locking ring from a location deeper than the locking ring in the socket after passing through the locking ring; an inner peripheral projection, formed in an inner peripheral portion of the socket which is located deeper than the locking ring receiving groove, for backing up the locking ring; a first inner peripheral surface having a larger diameter than the inner peripheral projection and formed in an inner peripheral portion of the socket which is located deeper than the inner peripheral projection; and a second inner peripheral surface formed between the first inner peripheral surface and the inner peripheral projection, the second inner peripheral surface being larger than the inner peripheral projection and smaller than the first inner peripheral surface in diameter.

With the above construction, the first inner peripheral surface having a larger diameter than the inner peripheral projection for backing up the locking ring is formed in the socket at a location deeper than the inner peripheral projection and, hence, the outer peripheral projection of the spigot can hardly abut against the inner periphery of the socket when the socket and spigot are bent relative to each other. This ensures a required bending capability.

Further, the second inner peripheral surface which is larger than the inner peripheral projection and smaller than the first inner peripheral surface in diameter is formed between the first inner peripheral surface and the inner peripheral projection. Accordingly, when the spigot is moved to a certain extent in the direction away from the socket so that the outer peripheral projection thereof comes closer to the inner peripheral projection, the second inner peripheral surface restricts the movement of the outer peripheral projection, thereby preventing the occurrence of a bend excessively greater than required.

The foregoing and other objects, features and attendant advantages will become apparent from the following detailed description.

DETAILED DESCRIPTION OF THE PREFERRED EMBODIMENTS

Figure 1:
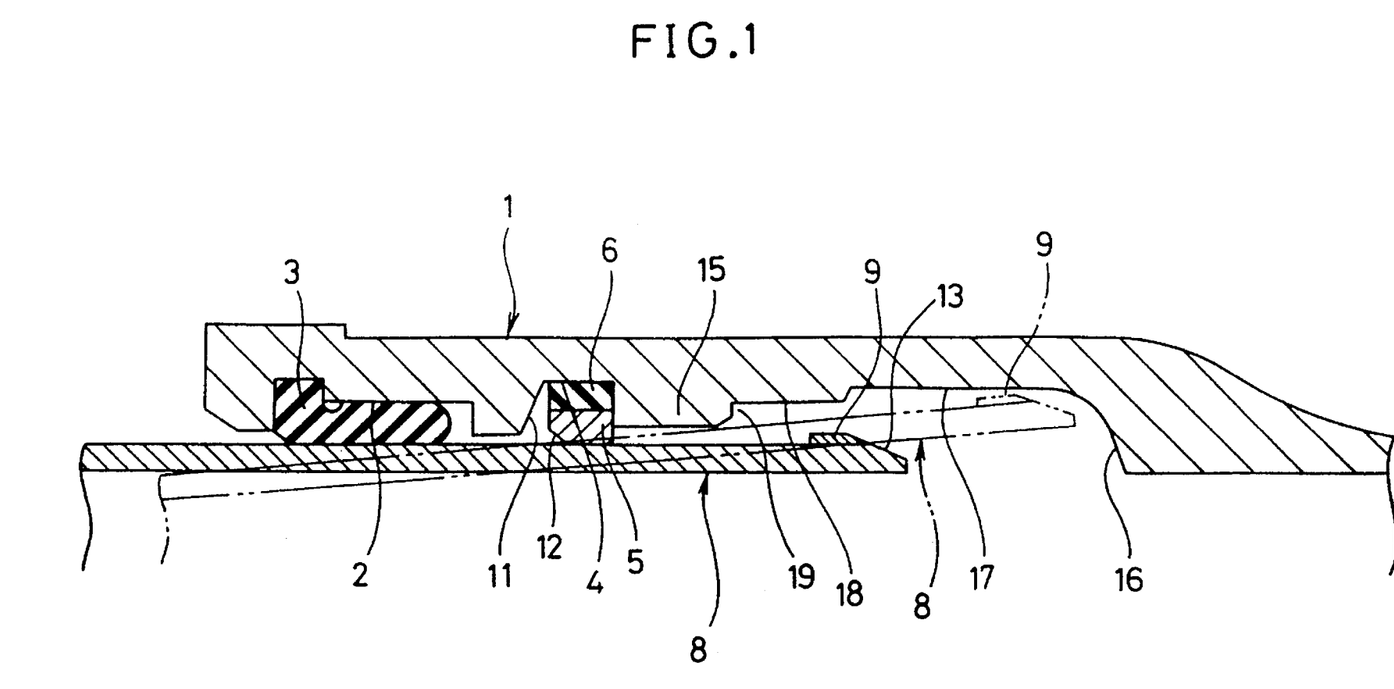
FIG. 1 is a longitudinal sectional view illustrating the major portion of a separation preventive pipe joint in accordance with one embodiment of the present invention.

Referring to FIG. 1, reference numeral 1 denotes a socket formed in an end portion of one of two cast-iron pipes to be joined together in which a rubber seal packing 3 is fitted in a seal packing receiving groove 2 formed in the inner peripheral portion of the socket 1. A locking ring receiving groove 4 is formed in the inner peripheral portion of the socket 1 which is located deeper than the seal packing receiving groove 2. A locking ring 5 of metal having one split in the circumference thereof is received in the locking ring receiving groove 4. Between the outer periphery of the locking ring 5 and the inner periphery of the locking ring receiving groove 4 is interposed an elastic ring 6 of rubber which is bonded onto the outer periphery of the locking ring 5.

Reference numeral 8 denotes a spigot formed in an end portion of the other pipe and insertable into the socket 1. On the outer periphery of the end portion of the spigot 8 is formed an outer peripheral projection 9 which is engageable with the locking ring 5 from a deeper location in the socket 1.

The sidewall of the locking ring receiving groove 4 on the side closer to the opening of the socket 1 comprises a tapered surface 11. As the locking ring 5 is moved toward the opening of the socket 1, the outer peripheral edge of the locking ring 5 engages the tapered surface 11. A tapered surface 12 is formed on an inner peripheral portion of the locking ring 5 on the side closer to the opening of the socket 1. The spigot 8 has a tapered surface 13 on the outer periphery of the end portion thereof.

An inner peripheral projection 15 for backing up the locking ring 5 is formed in an inner peripheral portion of the socket 1 which is located deeper than the locking ring receiving groove 4. The inner diameter of this inner peripheral projection 15 is made slightly larger than the outer diameter of the outer peripheral projection 9 on the end portion of the spigot 8. The length of the inner peripheral projection 15 along the pipe axis corresponds to the length of a portion of the spigot 8 extending from the outer peripheral projection 9 to the end surface of the spigot 8 along the pipe axis.

There is provided a given distance between the inner peripheral projection 15 and the deeper end 16 of the socket 1. A first inner peripheral surface 17 is formed in an inner peripheral portion of the socket 1 which is located deeper than the inner peripheral projection 15, i.e., adjacent to the deeper end 16. The inner diameter of the first inner peripheral surface 17 is made larger than that of the inner peripheral projection 15. There is also formed a second inner peripheral surface 18 between the first inner peripheral surface 17 and the inner peripheral projection 15. The inner diameter of the second inner peripheral surface 18 is made larger than that of the inner peripheral projection 15 and smaller than that of the first inner peripheral surface 17. The first and second inner peripheral surfaces 17 and 18 are each formed into a length of an appropriate range along the pipe axis. In the boundary between the inner peripheral projection 15 and the second inner peripheral surface 18 is formed a corner portion 19 angled at 90°.

When the socket 1 and the spigot 8 are to be joined together, the seal packing 3 is fitted into the seal packing receiving groove 2 of the socket 1, and the locking ring 5 with the elastic ring 6 bonded onto the outer periphery thereof is fitted into the locking ring receiving groove 4. The locking ring 5 thus received in the locking ring receiving groove 4 is held concentrically with respect to the axis of the socket 1 without any eccentricity thereto.

The spigot 8 is inserted into the socket 1 in the aforesaid conditions. During the insertion, initially the seal packing 3 is compressed by the outer periphery of the spigot 8 to ensure sealing between the socket 1 and spigot 8. Since the locking ring 5 is held without any eccentricity by the elastic ring 6, the occurrence of an inconvenience is prevented such that the end portion of the spigot 8 is caught by the locking ring 5 whereby the spigot 8 cannot be smoothly inserted. As the spigot 8 is forcibly further inserted with the end portion of the spigot 8 engaging the inner periphery of the locking ring 5, the locking ring 5 together with the elastic ring 6 is enlarged in diameter by interaction between the tapered surface 13 on the outer periphery of the end portion of the spigot 8 and the tapered surface 12 on the inner periphery of the locking ring 5, thereby permitting the outer peripheral projection 9 of the spigot 8 to readily pass through the inner periphery of the locking ring 5.

After the outer peripheral projection 9 has passed through the locking ring 5, the locking ring 5 resumes its initial state and is assuredly fitted around the outer periphery of the spigot 8. This ensures the engagement between the locking ring 5 and the outer peripheral projection 9. When the projection 9 engages the locking ring 5 by a force acting to remove the spigot 8 from the socket 1, the locking ring 5 is pressed against the outer periphery of the spigot 8 by means of the tapered surface 11 to ensure firm engagement of the outer peripheral projection 9 with the locking ring 5. This provides for highly reliable separation preventive capability.

The locking ring 5 is spaced a given distance from the deeper end 16 of the socket 1 and, hence, the socket 1 and the spigot 8 is expansible and retractable along the pipe axis relative to each other within this space. Further, the provision of the first inner peripheral surface 17 of a larger diameter adjacent to the deeper end 16 of the socket 1 allows the socket 1 and the spigot 8 to be bent relative to each other at a relatively large angle as depicted in phantom in FIG. 1. Specifically, the critical bend angle of a pipe joint of this type is generally set to about 8°. The first inner peripheral surface 17 having such a large diameter according to the present invention prevents the outer peripheral projection 9 of the spigot 8 from contacting the first inner peripheral surface 17 even when the critical bend angle is reached. This makes it possible to avoid accidents such as a damage to pipes which would otherwise occur due to stress caused by the contact between the outer peripheral projection 9 of the spigot 8 and the first inner peripheral surface 17 of the socket, for example, when an earthquake occurs.

Where a bend occurs when the end portion of the spigot 8 is positioned away from the deeper end 16 of the socket 1 and comes close to the inner peripheral projection 15, the bend may exceed the aforesaid critical angle if the inner diameter of a socket portion in which the outer peripheral projection 9 is present is as large as that of the first inner peripheral surface 17. In such a case, the seal packing 3 no longer follows the bend and, hence, leakage of fluid in the pipe to the outside may result.

Figure 2:
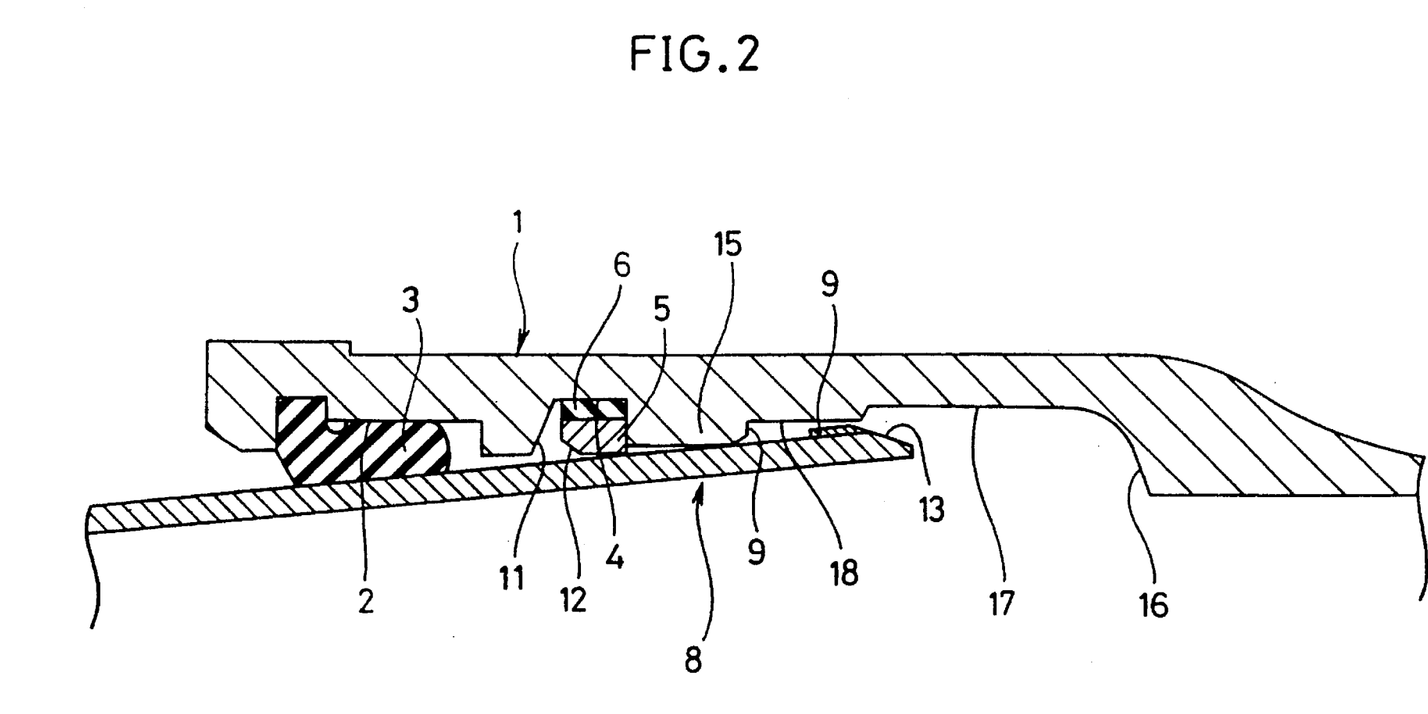
FIG. 2 is a longitudinal sectional view illustrating the separation preventive pipe joint of FIG. 1 in a bent state.

However, the provision of the second inner peripheral surface 18 of a smaller diameter than the first inner peripheral surface 17 in that portion restricts the movement of the outer peripheral projection 9 of the spigot 8 as shown in FIG. 2, thereby preventing the occurrence of such an excessive bend. Further, the portion of socket 1 formed with the second inner peripheral surface 18 can be made thicker than the portion in which the first inner peripheral surface 17 is formed. This allows the portion formed with the second inner peripheral surface 18 to have a required thickness without making the outer diameter thereof larger, resulting in the pipe joint having a reduced weight.

Where a pipe line is constructed using profile pipes, separation preventive pipe joints are often required to have no expansibility and retractability as well as bendability. In such a case, particularly where the socket of a straight pipe and the spigot of a profile pipe, which constitute a separation preventive pipe joint according to the present invention, are to be joined together, a metal liner 28 as shown in FIG. 3 is used.

Figure 3:
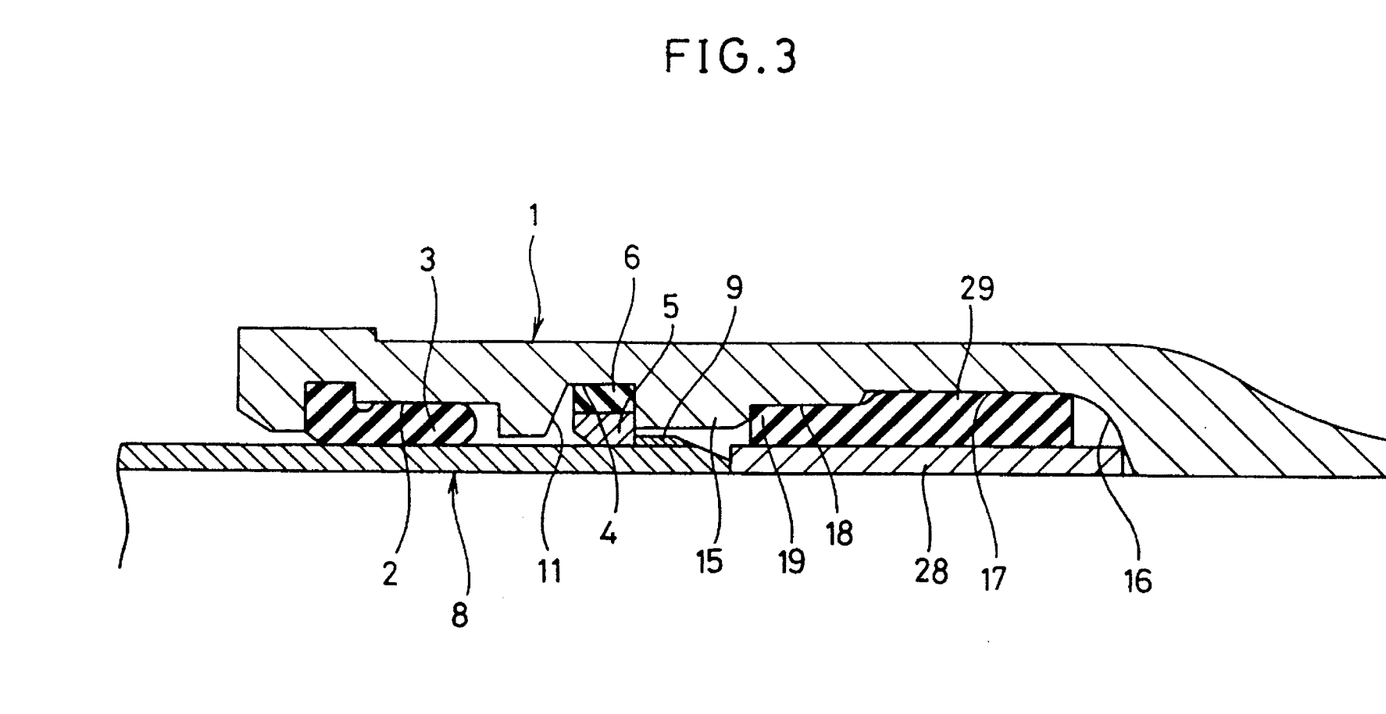
FIG. 3 is a longitudinal sectional view illustrating the separation preventive pipe joint of FIG. 1 provided with a retraction preventive liner.

More specifically the spigot 8 is inserted into the socket 1 into which the cylindrical liner 28 is preliminarily inserted so as to be positioned at a location corresponding to the first and second inner peripheral surfaces 17 and 18 as shown in FIG. 3. The inner and outer diameters of the liner 28 are respectively equal to those of the spigot 8. The presence of such a liner 28 causes the outer peripheral projection 9 of the spigot 8 to be positioned on an inner side of the inner peripheral projection 15 and adjacent the locking ring 5. The liner 28 faces opposite the end portion of the spigot 8 at one end thereof and the deeper end 16 of the socket 1 at the other and thereof.

With the aforesaid arrangement, expansion and retraction between the socket 1 and the spigot 8 as well as a bend therebetween are prevented. Further, since the inner diameter of the liner 28 is made equal to that of the spigot 8, any disturbance in the flow of fluid in the pipe which would otherwise occur due to the presence of the liner 28 can effectively be prevented.

Between the outer periphery of the liner 28 and the first and second inner peripheral surfaces 17 and 18 is interposed a cylindrical rubber centering member 29 serving as an elastic body for holding the liner. This centering member 29 is shaped rectangular in section. Therefore, a portion of the centering member 29 fits in the corner portion 19 angled at 90° in the boundary between the inner peripheral projection 15 and the second inner peripheral surface 18, whereby the centering member 29 is stably held in position.

Figure 4:
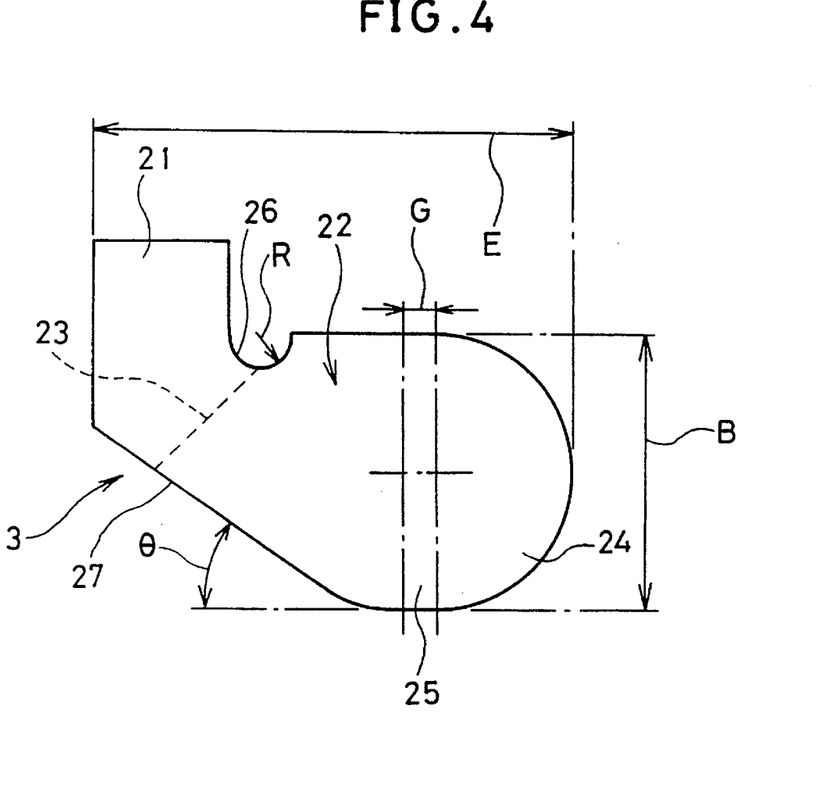
FIG. 4 is a sectional view illustrating a variation of a seal packing.
Figure 5:
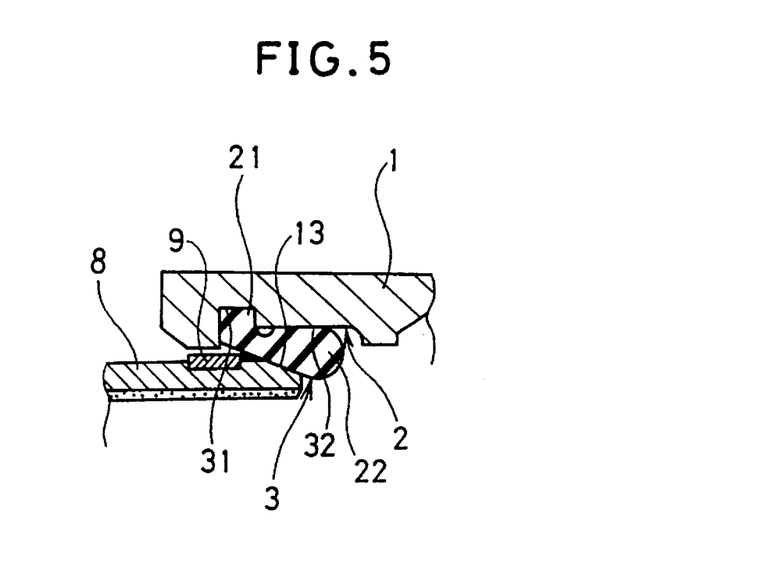
FIG. 5 is a diagram for illustrating the joining operation of a separation preventive pipe joint employing the packing shown in FIG. 4.

FIGS. 4 and 5 show a variation of the seal packing 3. The seal packing 3 has a section as shown in FIG. 4 when it is not compressed between the socket 1 and the spigot 8, or before it is attached to the socket 1.

The seal packing 3 comprises a heel portion 21 and a bulb portion 22 which are integrally formed by fusion bonding or a like process. The heel portion 21 is formed of a hard rubber, while the bulb portion 22 is formed of a soft rubber. Specifically, the heel portion 22 has a hardness of about 80 and the bulb portion 22 has a hardness of about 50. Reference numeral 23 designates an integrally joining surface of the heel portion 21 and bulb portion 22. As shown in FIG. 5, the heel portion 21 is formed as radially outwardly projecting so as to be fitted into a deep groove portion 31 of the seal packing receiving groove 2 in the socket 1. The bulb portion 22 is formed as having a thickness such as to be compressed between a press contact portion 32 of the seal packing receiving groove 2 and the outer periphery of the spigot 8. The bulb portion 22 includes a hemispherical portion 24 shaped semicircular in section on the end side and a parallel portion 25 formed as continued from the hemispherical portion 24 and having a uniform thickness along the axis. Reference character B indicates the thickness of the bulb portion 22, i.e., the diameter of the hemispherical portion 24, reference character G the length of the parallel portion 25 along the axis, and reference character E the length of the seal packing along the axis.

A thinning groove 26 is formed in the outer periphery of the seal packing 3 at the boundary between the heel portion 21 and the bulb portion 22. The thinning groove 26 is shaped into a semicircle in section having a radius R. Between the inner periphery of the heel portion 21 and the inner periphery of the bulb portion 22 is formed a tapered surface 27, the inner diameter of which gradually decreases from the heel portion 21 toward the bulb portion 22. Reference character θ indicates the taper angle of the tapered surface 27 defined between the axis of the seal packing 3 and the tapered surface 27.

Dimensions of each part of the seal packing 3 are as follows. The radius R of the thinning groove 26 is required to fall within the range of from 0.10 to 0.15 times the diameter B of the bulb portion 22. If the radius R exceeds 0.15B, the seal packing 3 becomes too thin in the portion formed with the thinning groove 26, thus resulting in weak engagement between the heel portion 21 and the socket 1. Consequently, there is a danger that the seal packing 3 receives the pressing force of the spigot 8 acting toward the deeper end of the socket 1 and comes out of its required position when the spigot 8 is inserted into the socket 1 as shown in FIG. 5. As a result, required sealing performance cannot be accomplished. On the other hand, if the radius R is smaller than 0.10B, substantial effect of forming the thinning groove 26 is lost. This is because the resistance against the force compressing the seal packing 3 when tile spigot 8 is inserted into the socket 1 cannot substantially be reduced, so that a greater force is required to join the joint parts. Further, a greater force is required to force-fit the seal packing 3 into the receiving groove 2, resulting in poor attachability.

The length G of the parallel portion 25 is required to fall within the range of from 0.2 to 0.8 times the length E of the seal packing 3. If the length G exceeds 0.8E, the resistance against the force compressing the seal packing 3 increases too much, thereby requiring a substantially large force for joining the joint parts. If the length G is smaller than 0.2E, there cannot be expected a substantial effect of providing the parallel portion 25, i.e., sealing capability required when the joint is bent. Accordingly, the intended sealing capability required upon a bend of the joint and suitable operatability for joining cannot be achieved unless the length G falls within the aforesaid range.

The taper angle θ is preferably 30°, which is sharper than the conventional taper angle of 23° and allows the entire length E of the seal packing 3 to be shortened.

With the aforesaid feature, the provision of the thinning groove 26 makes it possible to reduce the resistance against the force compressing the seal packing 3 when the spigot 8 is inserted into the socket 1. In addition, the operation for press-fitting the seal packing 3 into the receiving groove 2 of the socket 1 can be facilitated. Further, the formation of the parallel portion 28 prevents the sealing capability of the seal packing 3 from deteriorating when the compressibility of the seal packing 3 decreases upon the occurrence of a bend, since the parallel portion 25 is brought into close contact with both the bottom of the receiving groove 2 of the socket 1 and the outer periphery of the spigot 8. Furthermore, the seal packing 3 does not entirely have a uniform hardness with the heel portion 21 made relative hard and the bulb portion 22 made relatively soft and, hence, the engagement of the heel portion 22 with the deep groove portion 31 is ensured, thereby preventing the seal packing 3 from being displaced upon the joining of the joint parts. At the same time, the bulb portion 22 is expected to ensure a reliable sealing performance.

Figure 6:
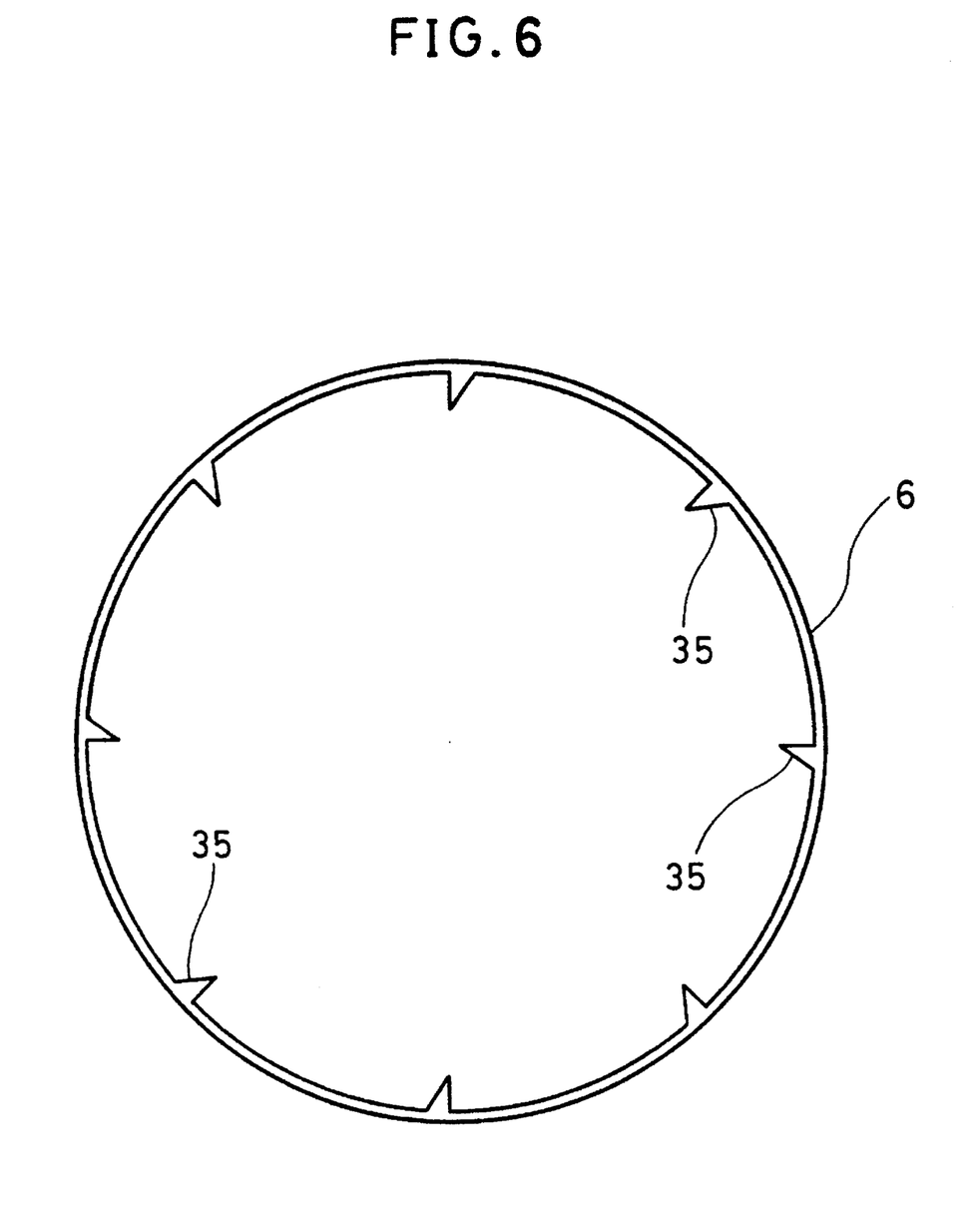
FIG. 6 is a diagram illustrating a variation of an elastic ring.
Figure 7:
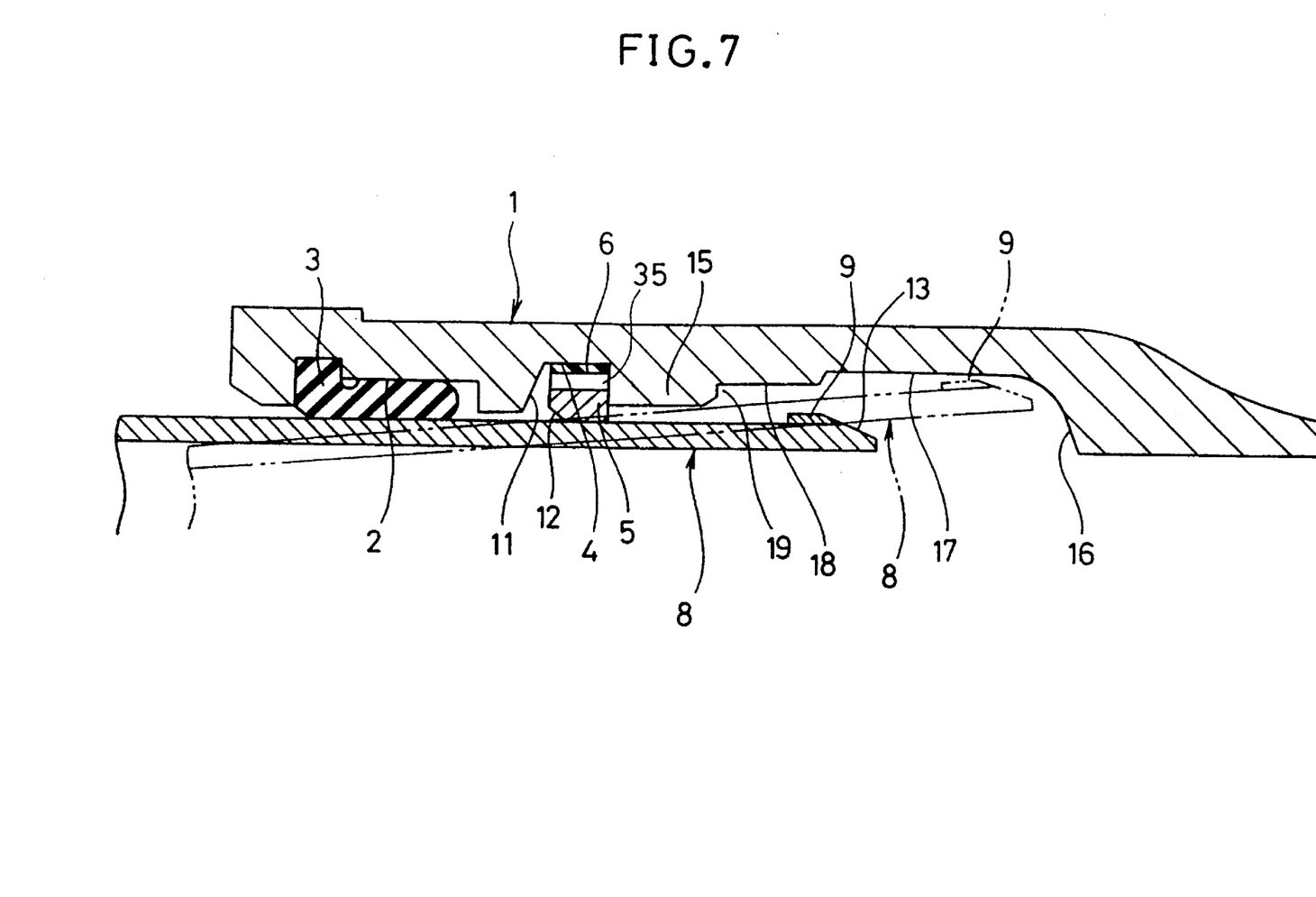
FIG. 7 is a longitudinal sectional view illustrating the major portion of a separation preventive pipe joint employing the elastic ring shown in FIG. 8.
Figure 8:
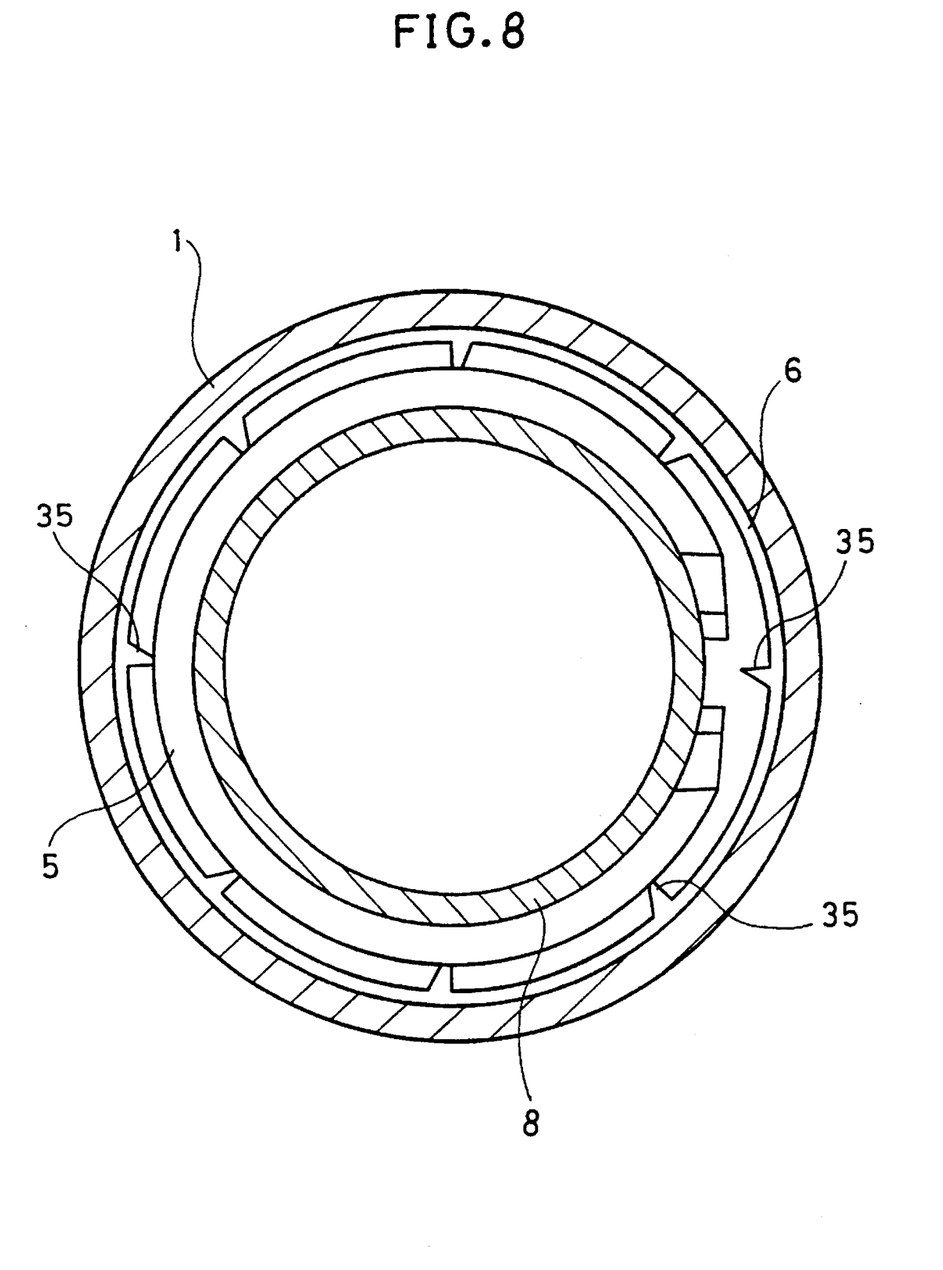
FIG. 8 is a cross sectional view of the part shown in FIG. 7.

FIGS. 6 to 9 show variations of the elastic ring 6. In these variations, the elastic ring 6 is a member separate from the locking ring 5 and is formed with holding projections 35 circumferentially spaced from one another at appropriate intervals. The holding projections 35 in the variation shown in FIGS. 6 to 8 are each shaped triangular in section. The locking ring 5 is held without any eccentricity with respect to the axis of the socket 1 by the holding projections formed on the inner periphery of the elastic ring 6.

With the aforesaid feature of the elastic ring 8, when the outer peripheral projection 9 of the spigot 8 passes through the inner periphery of the locking ring 5, the elastic ring 6 is compressed in the same manner as described above. In this case, the holding projections 35 of the elastic ring 6 are mainly compressed and, therefore, the compression is achieved relatively easily, so that the compression of the elastic ring 6 does not become a large resistance against the insertion of the spigot 8. This facilitates the insertion of the spigot 8 into the socket 1.

Figure 9:
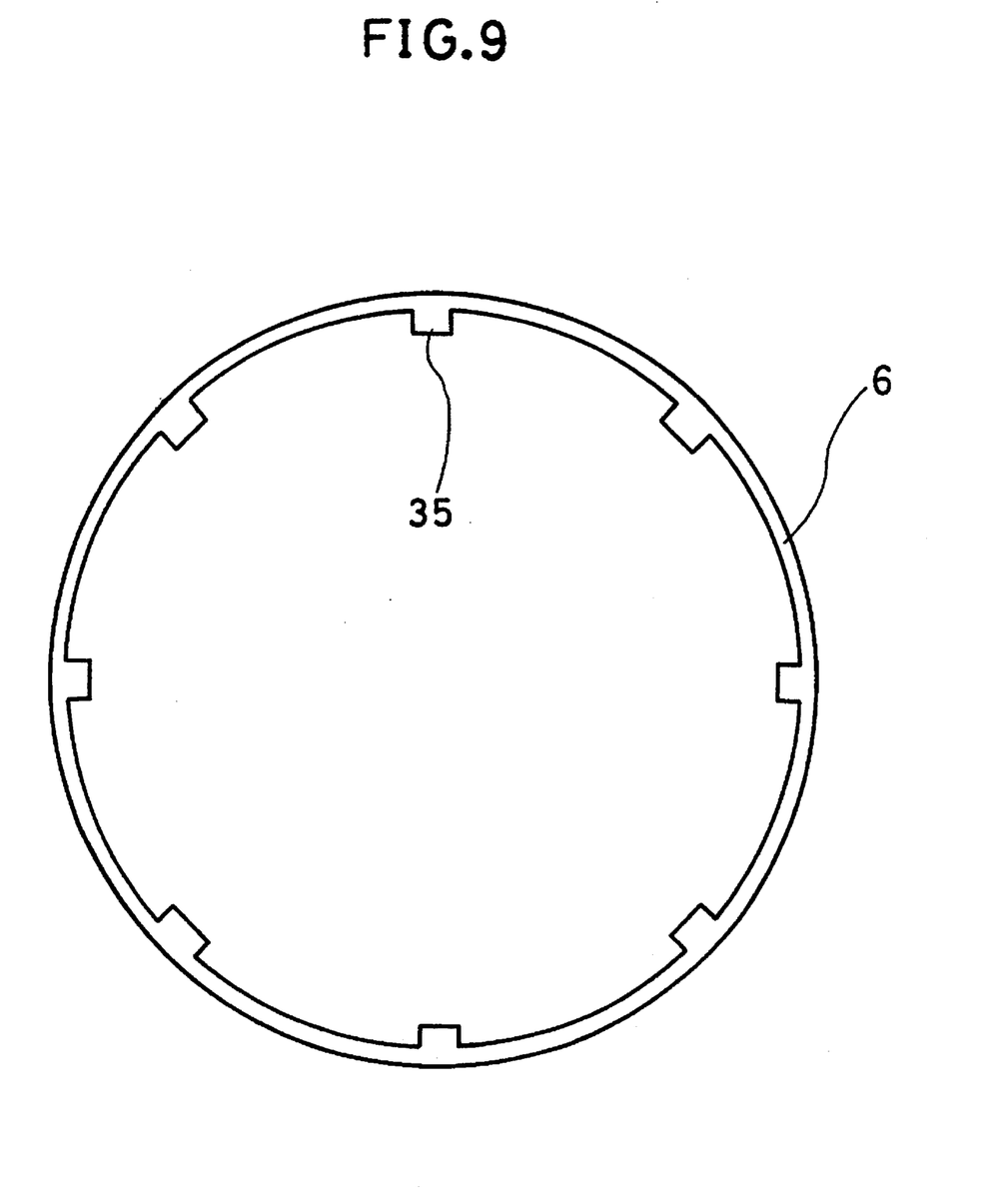
FIG. 9 is a diagram illustrating another variation of the elastic ring.

The sectional configuration of each holding projection 35 may be rectangular as shown in the embodiment of FIG. 9 as well as the aforesaid triangular configuration. Further, alternative configurations are possible according to the present invention.

While only certain presently preferred embodiments of the invention have been described in detail, as will be apparent to those skilled in the art, certain changes and modifications can be made in embodiments without departing from the spirit and scope of the invention as defined by the following claims.

What is claimed is:

1. A separation preventive pipe joint wherein a spigot formed in an end portion of one of two pipes to be joined together is insertable into a socket formed in an end portion of the other pipe, the pipe joint comprising:

a locking ring receiving groove formed in an inner periphery of the socket;

a locking ring having one split in the circumference thereof and fitted in the locking ring receiving groove;

an elastic ring interposed between an inner periphery of the locking ring receiving groove and an outer periphery of the locking ring and holding the locking ring while centering the same;

an outer peripheral projection formed on an outer periphery of an end portion of the spigot, the outer peripheral projection being capable of passing through the locking ring toward a deeper side of the socket while resiliently enlarging the diameter of the locking ring when the spigot is inserted into the socket and being engageable with the locking ring from a location deeper than the locking ring in the socket after passing through the locking ring;

an inner peripheral projection, formed in an inner peripheral portion of the socket which is located deeper than the locking ring receiving groove, for backing up the locking ring;

a first inner peripheral surface having a larger diameter than the inner peripheral projection and formed in an inner peripheral portion of the socket which is located deeper than the inner peripheral projection; and a second inner peripheral surface formed between the first inner peripheral surface and the inner peripheral projection, the second inner peripheral surface being larger than the inner peripheral projection and smaller than the first inner peripheral surface in diameter.

2. A separation preventive pipe joint as set forth in claim 1, further comprising a cylindrical liner having an inner diameter corresponding to that of the spigot and inserted in the socket in a position corresponding to the first and second inner peripheral surfaces so as to prevent the socket and the spigot from expanding and retracting relative to each other.

3. A separation preventive pipe joint as set forth in claim 2, further comprising a centering member interposed between an outer periphery of the liner and the first and second inner peripheral surfaces for centering and holding the liner.

4. A separation preventive pipe joint as set forth in claim 3, wherein the inner peripheral projection and the second inner peripheral surface define a corner portion in a boundary portion therebetween, into which a portion of the centering member is fitted.

5. A separation preventive pipe joint as set forth in claim 3, wherein the outer peripheral projection of the spigot is locatable on an inner peripheral side of the inner peripheral projection of the socket, while the inner diameter of the inner peripheral projection of the socket is slightly larger than the outer diameter of the outer peripheral projection of the spigot, whereby a bend between the socket and the spigot is limited.

6. A separation preventive pipe joint as set forth in claim 1, further comprising a rubber seal packing to be compressed between the socket and the spigot which is received in a receiving groove formed in an inner periphery of the socket and having a deep groove portion and a press contact portion, the seal packing comprising a heel portion fitted in the deep groove portion, a bulb portion having a thickness compressible between the press contact portion and an outer periphery of the spigot, and a thinning groove formed in an outer periphery of the seal packing at the boundary between the heel portion and the bulb portion, the bulb portion including a parallel portion having a uniform thickness along the axis of the seal packing.

7. A separation preventive pipe joint as set forth in claim 1, wherein the elastic ring has a plurality of holding projections in the inner periphery thereof for holding the locking ring at its outer periphery.

* * * * *